(12) United States Patent
Barnes

(10) Patent No.: US 8,881,414 B2
(45) Date of Patent: Nov. 11, 2014

(54) INCLINATION MEASUREMENT DEVICES AND METHODS OF USE

(71) Applicant: Magnum Drilling Services, Inc., Oklahoma City, OK (US)

(72) Inventor: Matthew J. Barnes, Conroe, TX (US)

(*) Notice: Subject to any disclaimer, the term of this patent is extended or adjusted under 35 U.S.C. 154(b) by 0 days.

(21) Appl. No.: 14/021,060

(22) Filed: Sep. 9, 2013

(65) Prior Publication Data

US 2014/0026428 A1    Jan. 30, 2014

Related U.S. Application Data

(63) Continuation-in-part of application No. 13/057,269, filed as application No. PCT/US2010/045781 on Aug. 17, 2010, now Pat. No. 8,528,219.

(60) Provisional application No. 61/234,426, filed on Aug. 17, 2009.

(51) Int. Cl.
| | |
|---|---|
| E21B 47/022 | (2012.01) |
| E21B 47/18 | (2012.01) |
| G01C 1/00 | (2006.01) |
| E21B 47/024 | (2006.01) |

(52) U.S. Cl.
CPC .............. *E21B 47/022* (2013.01); *E21B 47/18* (2013.01); *G01C 1/00* (2013.01); *E21B 47/024* (2013.01)
USPC .......................................................... 33/304

(58) Field of Classification Search
USPC ................... 33/302, 303, 304, 306, 312, 314
See application file for complete search history.

(56) References Cited

U.S. PATENT DOCUMENTS

| | | | |
|---|---|---|---|
| 2,303,360 A | 12/1942 | Irwin et al. | |
| 3,526,041 A * | 9/1970 | Alder | 33/306 |
| 3,932,836 A | 1/1976 | Harrel et al. | |
| 3,958,217 A | 5/1976 | Spinnler | |
| 3,982,224 A | 9/1976 | Patton | |
| 3,997,867 A | 12/1976 | Claycomb | |
| 4,001,775 A | 1/1977 | Sexton et al. | |
| 4,033,429 A | 7/1977 | Farr | |
| 4,057,781 A | 11/1977 | Scherbatskoy | |
| 4,066,995 A | 1/1978 | Matthews | |
| 4,100,528 A | 7/1978 | Bernard et al. | |
| 4,103,281 A | 7/1978 | Strom et al. | |
| RE29,734 E | 8/1978 | Manning | |
| 4,120,198 A | 10/1978 | Tanguy et al. | |
| 4,147,223 A | 4/1979 | Patton | |
| 4,167,000 A | 9/1979 | Bernard et al. | |
| RE30,246 E | 4/1980 | Richter, Jr. et al. | |
| 4,215,426 A | 7/1980 | Klatt | |
| 4,224,687 A | 9/1980 | Claycomb | |
| 4,303,994 A | 12/1981 | Tanguy | |
| 4,385,449 A | 5/1983 | Miller | |
| 4,459,759 A * | 7/1984 | Hulsing, II | 33/304 |
| 4,599,904 A | 7/1986 | Fontenot | |
| 4,734,892 A | 3/1988 | Kotlyar | |
| 4,734,893 A | 3/1988 | Claycomb | |
| 4,783,742 A * | 11/1988 | Peters | 33/304 |

(Continued)

*Primary Examiner* — G. Bradley Bennett

(57) ABSTRACT

Downhole tools are provided for measuring the inclination of a portion of a drill string. In certain embodiments, downhole tools for measuring inclination comprise a catch system for measuring inclination and a pressure pulse signaling system for communicating inclination measurement information to the surface. Catch systems for measuring inclination include a series of disc mounted on an upper shaft, each disc having a ball disposed thereon.

13 Claims, 9 Drawing Sheets

(56) References Cited

U.S. PATENT DOCUMENTS

| | | |
|---|---|---|
| 4,805,449 A | 2/1989 | Das |
| 4,833,914 A | 5/1989 | Rasmus |
| 4,847,815 A | 7/1989 | Malone |
| 4,852,399 A | 8/1989 | Falconer |
| 4,876,886 A | 10/1989 | Bible et al. |
| 4,914,637 A | 4/1990 | Goodsman |
| 4,949,575 A | 8/1990 | Rasmus |
| 5,073,877 A | 12/1991 | Jeter |
| 5,136,525 A | 8/1992 | Cloud |
| 5,150,333 A | 9/1992 | Scherbatskoy |
| 5,154,078 A | 10/1992 | Codazzi |
| 5,182,731 A | 1/1993 | Hoelscher et al. |
| 5,197,040 A | 3/1993 | Kotlyar |
| 5,237,540 A | 8/1993 | Malone |
| 5,275,040 A | 1/1994 | Codazzi |
| 5,314,030 A | 5/1994 | Peterson et al. |
| 5,318,137 A | 6/1994 | Johnson et al. |
| 5,318,138 A | 6/1994 | Dewey et al. |
| 5,332,048 A | 7/1994 | Underwood et al. |
| 5,373,481 A | 12/1994 | Orba et al. |
| 5,375,098 A | 12/1994 | Malone et al. |
| 5,586,083 A | 12/1996 | Chin et al. |
| 5,586,084 A | 12/1996 | Barron et al. |
| 5,636,178 A | 6/1997 | Ritter |
| 5,740,126 A | 4/1998 | Chin et al. |
| 5,883,516 A | 3/1999 | Van Steensyk et al. |
| 5,987,385 A | 11/1999 | Varsamis et al. |
| 6,038,513 A | 3/2000 | Varsamis et al. |
| 6,105,690 A | 8/2000 | Biglin, Jr. et al. |
| 6,118,223 A | 9/2000 | Canova |
| 6,219,301 B1 | 4/2001 | Moriarty |
| 6,227,310 B1 * | 5/2001 | Jamieson ............ 33/303 |
| 6,396,276 B1 | 5/2002 | Van Steensyk et al. |
| 6,490,808 B1 | 12/2002 | Roux |
| 6,601,658 B1 | 8/2003 | Downton |
| 6,636,159 B1 | 10/2003 | Winnacker |
| 6,672,382 B2 | 1/2004 | Schultz et al. |
| 6,714,138 B1 | 3/2004 | Turner et al. |
| 6,909,667 B2 | 6/2005 | Shah et al. |
| 6,970,398 B2 | 11/2005 | Lavrut et al. |
| 6,975,244 B2 | 12/2005 | Hahn et al. |
| 7,083,008 B2 | 8/2006 | Thorp et al. |
| 7,136,795 B2 | 11/2006 | Downton |
| 7,168,507 B2 | 1/2007 | Downton |
| 2002/0070368 A1 | 6/2002 | Rountree et al. |
| 2003/0151977 A1 | 8/2003 | Shah et al. |
| 2004/0156265 A1 | 8/2004 | Lavrut et al. |
| 2004/0262043 A1 | 12/2004 | Schaaf |
| 2004/0262044 A1 | 12/2004 | Schaaf |
| 2005/0000733 A1 | 1/2005 | Schaaf |
| 2005/0045344 A1 | 3/2005 | Fraser et al. |
| 2005/0140153 A1 | 6/2005 | Airey |
| 2007/0011895 A1 | 1/2007 | Bartel et al. |
| 2007/0056771 A1 | 3/2007 | Gopalan et al. |
| 2007/0284106 A1 | 12/2007 | Kalman et al. |
| 2008/0136665 A1 | 6/2008 | Aiello et al. |
| 2008/0204270 A1 | 8/2008 | Aiello et al. |
| 2012/0305313 A1 * | 12/2012 | DiFoggio ............ 33/306 |

* cited by examiner

INCLINATION MEASUREMENT DEVICES AND METHODS OF USE

CROSS REFERENCE TO RELATED APPLICATION

This application claims priority to and benefit of U.S. provisional patent application 61/234,426 entitled "Inclination Measurement Devices and Methods of Use" filed on Aug. 17, 2009, and U.S. patent application Ser. No. 13/057,269 entitled "Inclination Measurement Devices and Methods of Use" filed Feb. 2, 2011, which are hereby incorporated by reference in their entirety.

BACKGROUND

The present disclosure generally relates to a downhole tool employed during hydrocarbon exploration activities. Specifically, the present disclosure relates to devices and methods for measuring inclination or deviation from a vertical axis of a downhole tool.

In the drilling wells for production of hydrocarbons, it is often necessary to determine the inclination of a downhole tool or a portion of a drill string. Knowledge of the inclination, otherwise known as deviation from the vertical, is often desirable to determine the direction a sub-surface end of a drill string is oriented so that adjustments may be made to properly orient the drill string while drilling a borehole. Further, measurement of the inclination of the drill string may provide an indication of the borehole inclination at the point the measurement is made. In many instances, laws or other regulations require measurement of a borehole inclination at specified interval distances, typically every 1,000 ft. Further, it is often undesirable for boreholes to intersect other boreholes, such as multiple boreholes from a single platform. Determination of inclination may assist in avoiding such intersection.

Conventional mechanical methods in the art for measuring drill string inclination usually involve a complicated swinging pendulum mechanism. Essentially, in the conventional mechanical prior art systems, a pendulum device swings outwardly in response to an inclination or a deviation from a vertical axis. The pendulum device moves axially through a number of increasingly restrictive rings until the pendulum "hooks" or catches one of the restrictive rings preventing further axial movement of the pendulum. These conventional mechanical methods typically involve coding systems that translate small movements of a pendulum and rod into relatively long movements of a pressure pulse knob for communicating inclination measurement information to the surface via a series of pressure wave pulses through the drilling mud.

Unfortunately, these conventional mechanical devices for measuring inclination suffer from a number of significant disadvantages. In particular, the pendulum mechanisms are complicated and comprise many moving parts. Consequently, these conventional mechanical systems are expensive and prone to failure, particularly in the hostile conditions normally encountered in downhole environments. Additionally, because relatively small movements of the pendulum mechanisms are typically used to signal inclination measurements, the pendulum mechanisms sometimes suffer from unacceptably poor accuracy. In some instances, the pendulum mechanisms have been known to fail to properly engage at the desired inclination due to vibration or due to excessive axial speed of the pendulum device during inclination measurement. Consequently, these devices are known to be sometimes unreliable.

Accordingly, mechanical devices for measuring inclination and methods are needed to address one or more of the disadvantages of the prior art.

SUMMARY

In one embodiment, a downhole tool for measuring and communicating inclination of a portion of a drill string includes a housing having a flow conduit therein for flow of drilling fluid therethrough, the flow conduit having a plurality of passage restrictions therein. A knob is axially movable within the flow conduit, wherein the knob is adapted to interact with the passage restrictions to cause a flow restriction when the knob is directly adjacent one of the passage restrictions. A spring is adapted to bias the knob in a first direction, wherein the knob is movable upon the influence of the flow of drilling fluid in a second direction wherein the second direction is opposite the first direction. The knob is operably connected to an upper shaft and a plurality of discs operably connected to the upper shaft, wherein each disc is angled with respect to the upper shaft. One or more balls are disposed on each of the discs. A catch pocket is adjacent the discs, wherein the catch pocket is adapted to engage at least one ball and arrest the upper shaft from any further axial movement in the first direction upon sufficient inclination of the upper shaft. A dampening mechanism adapted to dampen movement of the upper shaft in at least one axial direction.

BRIEF DESCRIPTION OF THE DRAWINGS

A more complete understanding of the present disclosure and advantages thereof may be acquired by referring to the following description in conjunction with the accompanying figures, wherein.

Figure 1:
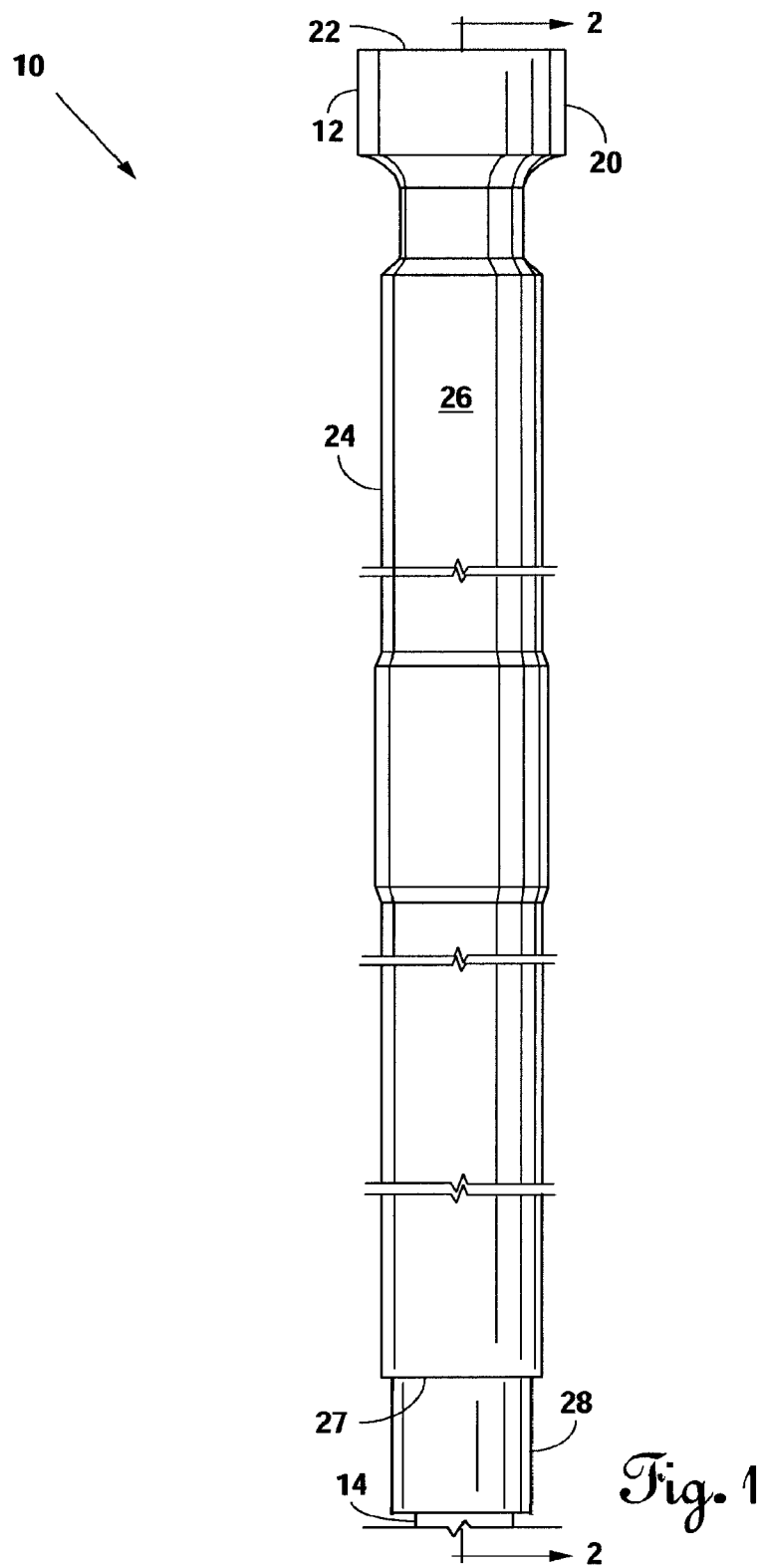
FIG. 1 illustrates a downhole tool for measuring and communicating inclination in accordance with one embodiment of the present disclosure.

While the present disclosure is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

Downhole tools are provided for measuring the inclination of a portion of a drill string. In certain embodiments, downhole tools for measuring inclination comprise a catch system for measuring inclination and a pressure pulse signaling system for communicating inclination measurement information to the surface, both of which are further described in detail below with reference to FIGS. 1-7. Briefly, the catch systems for measuring inclination of the present disclosure include a series of discs mounted on an upper shaft, each disc having one or more balls disposed thereon. In certain embodiments, the top surface of each consecutive disc is angled at an increasing angle such that one or more balls are displaced toward or away from an upper shaft upon achieving an inclination that corresponds to the angle of the top surface of each respective disc. The subsequent engagement of one of the balls in the catch pocket acts to arrest further movement of the upper shaft. The extent of axial movement of the upper shaft, which corresponds to a particular inclination, may then be communicated to the surface, such as via a pressure pulse signaling system.

Advantages of certain embodiments of the present disclosure include, but are not limited to, more accurate measurements, a more robust measuring mechanism less susceptible to false readings than conventional mechanical inclinometers, less complex than conventional mechanical devices, and increased reliability particularly with respect to a more positive retention of the catch system. Other features and benefits will be evident from the following disclosure.

To facilitate a better understanding of the present disclosure, the following examples of certain embodiments are given. In no way should the following examples be read to limit, or define, the scope of the invention.

For convenience of reference, when referring to components in axial or longitudinal relation to one another on the drill string, the term "lower" refers to components closer or proximate to the drill bit whereas "upper" refers to components away from or distal from the drill bit.

Figure 2:
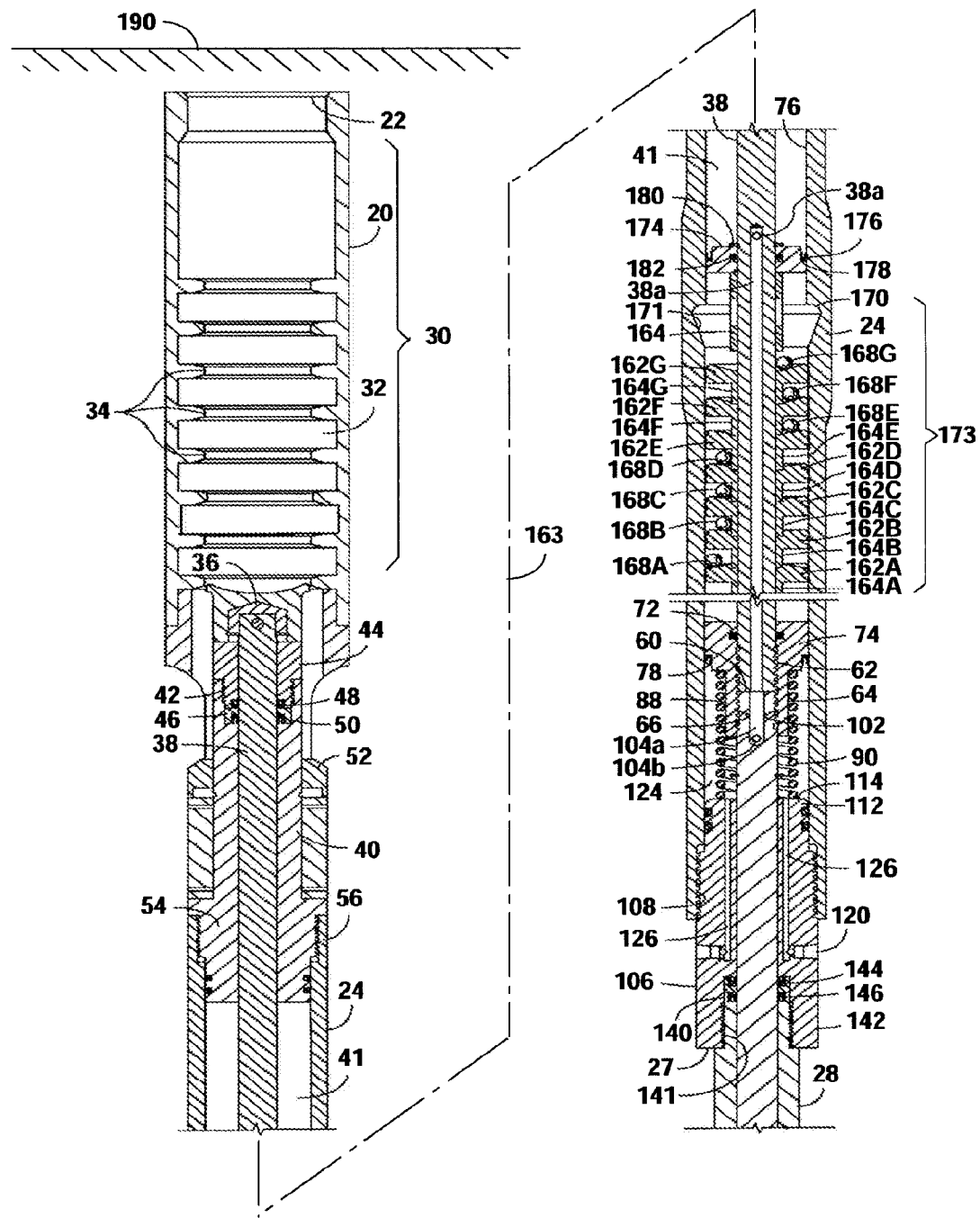
FIG. 2 illustrates a sectional view taken along the section lines 2-2 of the downhole tool of FIG. 1.

FIG. 1 illustrates a downhole tool 10 that is adapted to be coupled to a drill string 14, wherein the drill string 14 includes various components such as a motor, subs, pipe and a bit. Downhole tool 10 extends from an upper end 12 to a lower end 14 and includes substantially hollow pulse ring housing 20 having bore 22 therethrough (FIG. 2). A generally cylindrical tool housing 24 having outer surface 26 is coupled to pulse ring housing 20. Lower outboard gland 28 is coupled to bottom 27 of tool housing 24. In a preferred embodiment, pulse ring housing 20 and tool housing 24 are made of stainless steel to increase their corrosion resistance. Other metal alloys, such as, but not limited to carbon steel, may be used, depending on downhole conditions.

Figure 3:
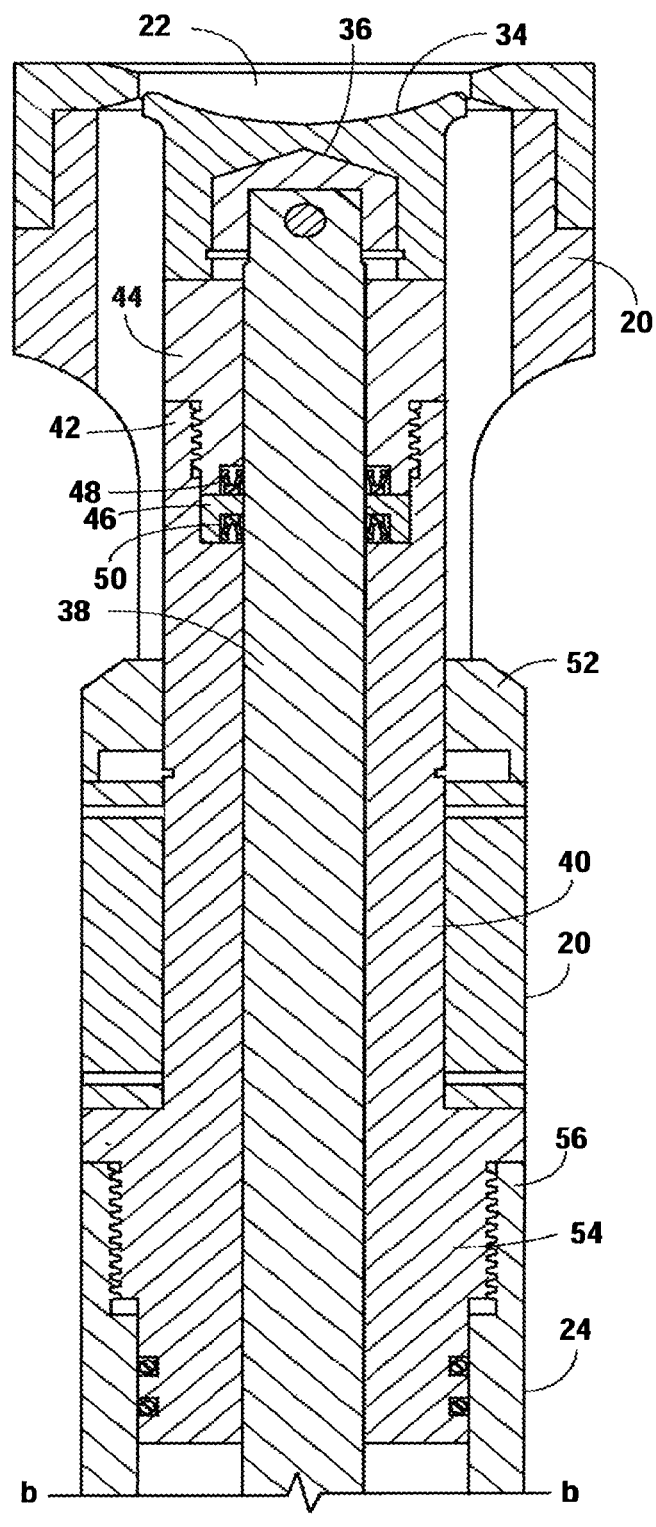
FIG. 3 is an exploded view depicting internal components of the downhole tool of FIG. 2 and omitting some components for clarity.

Turning now to FIGS. 2 and 3, pressure pulse signaling system 30 is disposed within pulse ring housing 20. Pressure pulse signaling system 30 includes flow conduit 32 through which drilling fluid is directed as will be understood by those of ordinary skill in the art. Passage restrictions 34 are provided in series along flow conduit 32. The operation of the flow conduit 32 and passage restrictions 34 will be explained in greater detail below. Knob 36 is disposed atop upper shaft 38 and is capable of traversing at least partially through flow conduit 32. Upper shaft 38 extends downwardly through upper cap 40. In one embodiment, upper shaft 38 is a hollow shaft having hole 38a disposed thereon. Hole 38a is in fluid communication with cross hole 38b that extends axially through upper shaft 38. Hole 38a is also in fluid communication with space 41 defined between inner surface 76 and upper shaft 38. Upper end 42 of upper cap 40 is coupled to lower end 44 of pulse ring housing 20. Upper end 42 and lower end 44 of pulse ring housing 20 may be coupled by any means known to those of skill in the art. For example, threaded sections may be provided on upper end 42 and lower end 44. Other methods of coupling metal parts are known to those of skill in the art. Gland 46 is disposed around the upper shaft 38. Upwardly turned wiper seal 48 is disposed above gland 46 and downwardly turned wiper seal 50 is disposed below gland 46. Those of ordinary skill in the art with the benefit of this disclosure will recognize that other known seals may be used in the place of the wiper seals shown in FIGS. 2 and 3. Top cover 52 is disposed around upper cap 40. Bottom portion 54 of upper cap 40 is threadably coupled to top end 56 of tool housing 24.

Figure 5:
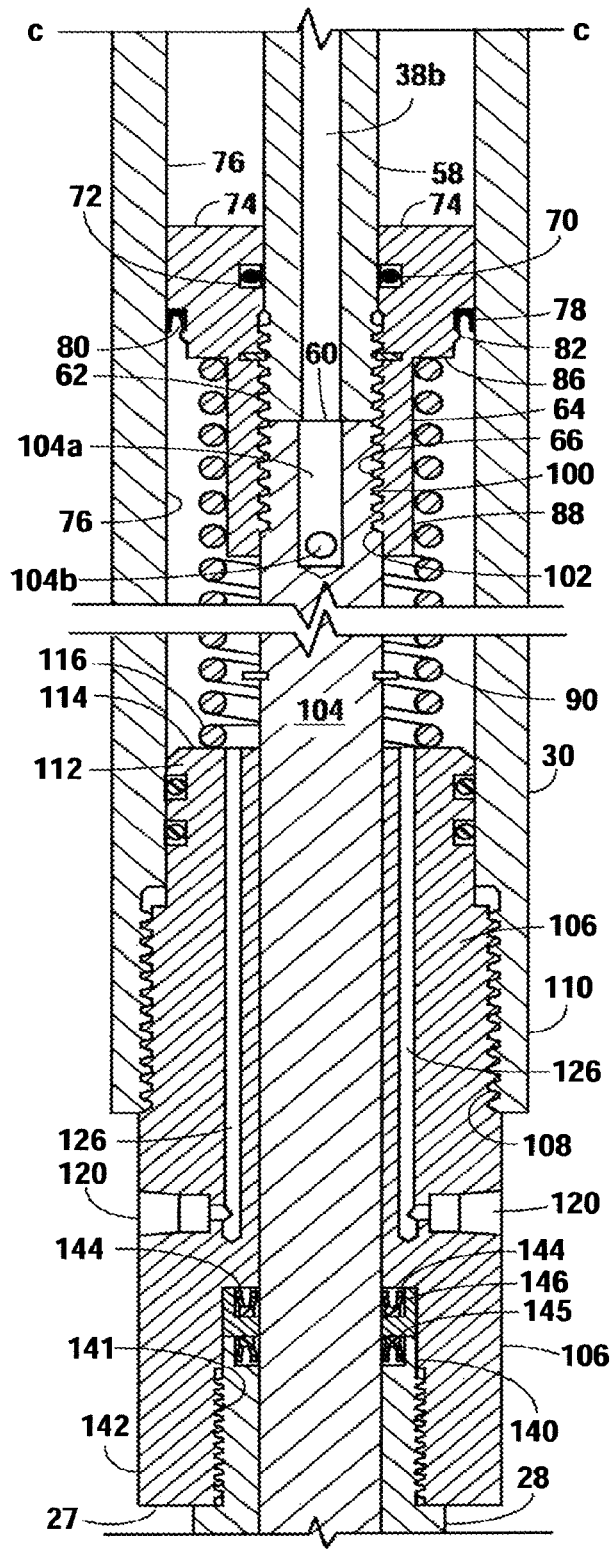
FIG. 5 depicts yet another exploded view depicting internal components of the downhole tool of FIG. 2 and omitting some components for clarity

With reference to FIG. 5, lower end 60 of upper shaft 38 has threaded portion 62. Threaded portion 62 of lower end 60 partially extends through and is coupled to coupler 64 that has internal threads 66 disposed thereon. O-ring 70 is disposed around lower end 60 of upper shaft 38 above threaded portion 62. An outer portion of O-ring 70 is received within notch 72 provided on the internal surface of the coupler 64. Flanges 74 extend outwardly from the coupler 64 and abut inner surface 76 of tool housing 30. Downwardly turned wiper seal 78 is disposed within recess 80 on underside 82 of flange 74. Wiper seal 78 is retained in position by ring 84 that protrudes outwardly from coupler 64. Shoulder 86 also extends outwardly from coupler 64. Sleeve 88 extends downwardly from shoulder 86 through the inner diameter of biasing mechanism 89 such as spring 90 that retains shoulder 86 on a top portion thereof. In one embodiment of the downhole tool 10, biasing mechanism 89 may include any apparatus capable of biasing upper shaft 38 in an upper or first direction, including but not limited to electrical or mechanical biasing mechanisms known in the art, coiled springs, or any other springs known to those of ordinary skill in the art.

Inner surface 100 of sleeve 88 is threaded and adapted to couple upper shaft 38 to upper threaded portion 102 of lower shaft 104. A hole 104a is provided on lower shaft 104 and is in fluid communication with cross hole 104b that extends upwardly through a portion of lower shaft 104b. Hole 104a is in fluid communication with hole 38b of upper shaft 38. Lower shaft 104 extends downwardly through spring 90 and housing 30 into lower cap 106. Lower cap 106 has threaded section 108 that is coupled to threaded lower end 110 of housing 30. Upper end 112 of lower cap 106 has relatively flat surface 114 where bottom end 116 of spring 90 rests. Fill ports 120 are provided on external surface 122 of lower cap 106. Fill ports 120 are in fluid communication with space 124 defined by housing 30, lower cap 106, and coupler 64 via fluid passages 126 provided within lower cap 106. Space 124 is also in fluid communication with cross hole 104b.

Partially threaded recess 140 is disposed at bottom end 142 of lower cap 106. Threaded portion of recess 140 is adapted to be coupled with external threaded section 141 of lower outboard gland 28. First upwardly turned wiper seal 144 is disposed around top portion 146 of partially threaded recess 140. Wiper seal 144 is retained in position by second gland 146 that is provided beneath wiper seal 144. Second downwardly turned wiper seal 145 is disposed between recess 140 and lower shaft 104 such that wiper seal 145 and abuts second gland 146. In a preferred embodiment, wiper seal 145 is capable of maintaining a seal when exposed to 5000 psi pressure. In other embodiments, wiper seal 145 is adapted to withstand pressures greater than 5000 psi. Those of ordinary skill in the art with the benefit of this disclosure will recognize that other known seals that are capable of withstanding the downhole pressures to which the seals are exposed may be used in place of the wiper seals shown in FIG. 5.

Figure 6:
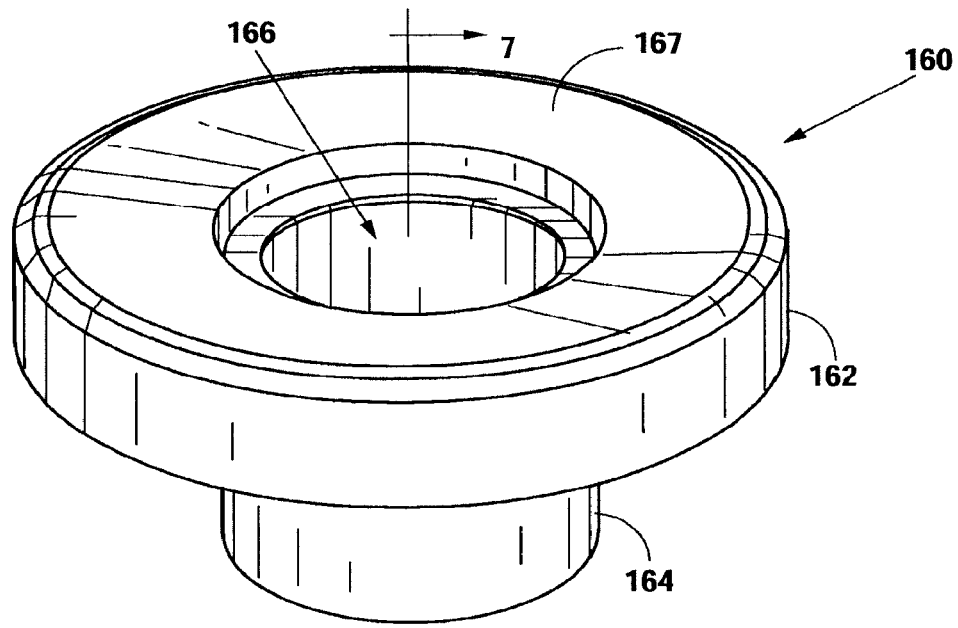
FIG. 6 is an isometric view of a T-shaped element of the downhole tool of FIG. 2.
Figure 7:
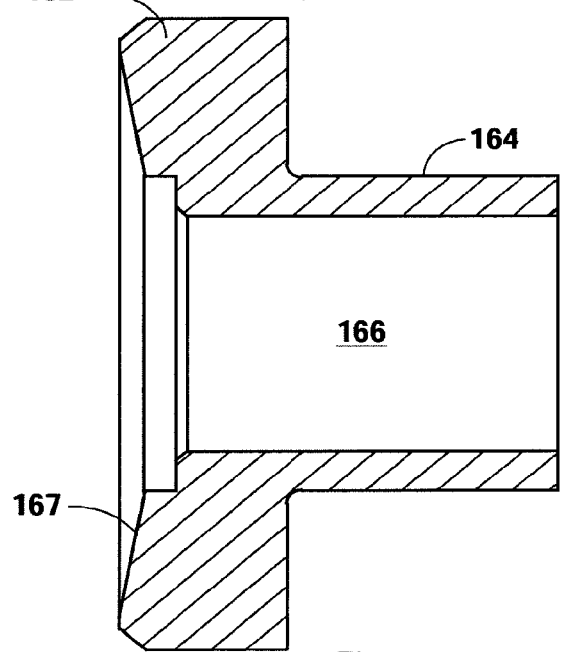
FIG. 7 is a sectional view of the T-shaped element taken along the section lines 6-6 of FIG. 6.

FIGS. 6 and 7 illustrate T-shaped element 160 comprising disc 162 and disc spacer 164 depending downwardly therefrom. Disc 162 and disc spacer 164 have void 166 disposed therethrough to accommodate upper shaft 38. In one preferred embodiment, disc spacer 164 is made of aluminum. In another preferred embodiment, disc 162 is made of ferrous steel. In yet another preferred embodiment, disc 162 is made of titanium. In yet another embodiment, disc 162 is made of a ceramic material.

Figure 4:
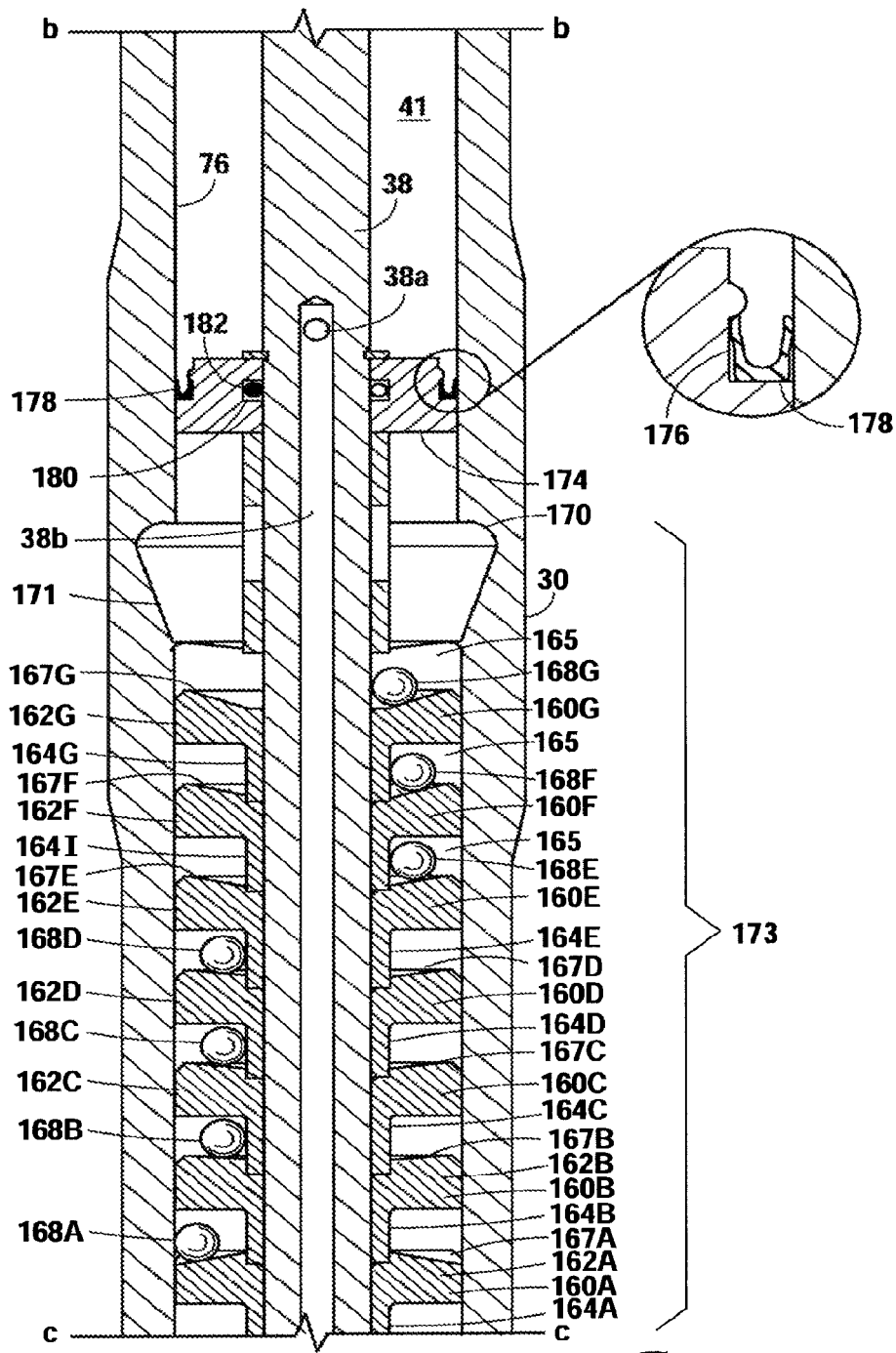
FIG. 4 depicts another exploded view depicting internal components of the downhole tool of FIG. 2 and omitting some components for clarity.

Several T-shaped elements 160 are stacked in series on upper shaft 38 (See FIGS. 2 and 4) to define ball spaces 165A-165G between respective discs 162A-162G. T-shaped elements 160 typically are machined to form a precision fit of 1/1000 inch between void 166 and the upper shaft 138. Top surface or upper surface 167 of each disc 162A-162G of T-shaped element 160 is machined to have a known inclination angle relative to the vertical axis of the downhole tool 10. In certain embodiments, the inclination angle of top surface or upper surface 167A-167G of each disc 162A-162G is incrementally different. For example, top surface 167A of disc 162A is machined to have an angle of about −1 degree relative to the perpendicular of the vertical axis 163 of downhole tool 10 (FIG. 2). Top surface 167B of disc 162B may be machined to have an angle of about 1 degree relative to vertical axis 163. Top surface 167C of disc 163C may be machined to have an angle of about 2 degrees and so forth. In one embodiment, the inclination of top surfaces 167A-167G of successive discs 162A-162G differs by about 0.5°. Other embodiments may include more or fewer discs that have varying inclinations such as but not limited to 0.125° or 0.75°. The present disclosure is not limited to embodiments having seven (162A-162G) discs. More or fewer discs may be installed on upper shaft 38 depending on the expected operating conditions. Balls 168A-168G are disposed on each top surface 167A-167G within ball spaces 165A-165G defined between respective discs 162A-162G. As will be explained in greater detail below, balls 168A-168G are used to measure an inclination of the downhole tool 10 from the earth's vertical axis when at least one of balls 168A-168G rolls on respective top surfaces 167A-167G and is caught in catch pocket 170 that is machined on inner surface 76 of housing 30. The combination of housing 30, upper shaft 38, T-shaped elements 160A-160G, and catch pocket 170 form catch system 173 (FIG. 4). Wiper seal 145 protects the components of catch system 173 from downhole pressures. In one preferred embodiment, catch system 173 components are made of a titanium, carbide, and stainless steel. In another preferred embodiment, upper shaft 38 and/or other components of catch system 173 are coated with a nickel/tungsten coating to make such parts resistant to chloride exposure in drilling environments.

With continuing reference to FIG. 4, retainer ring 174 is disposed around upper shaft 38. Recess 176 is formed on retainer ring 174 and is adapted to receive upwardly turned wiper seal 178. Wiper seal 178 is in contact with inner surface 76 of housing 30. O-ring 180 is disposed between the retainer ring 174 and upper shaft 38.

In certain embodiments of the present invention, T-shaped elements 160 may be replaced in the field by operators of the inclination measurement tool. In those embodiments, T-shaped elements 160 with certain inclination angles relative to the vertical axis of downhole tool 10 are designed to be unstacked and replaced with alternative T-shaped elements with different inclination angles relative to the vertical axis of downhole tool 10. Typically, the replacement of T-shaped elements 160 may be accomplished through the use of common hand tools.

Catch System

In one preferred embodiment, discs 162A-162G and other components of downhole tool 10 are comprised of a mix of titanium, carbide, and stainless steel. Other alloys including, but not limited to carbon steel may also be used for the components of downhole tool 10. As discussed above, each top surface 167 of discs 162A-162G is inclined at an inclination to the vertical axis 163 of the downhole tool 10. For example, in one embodiment, top surface 167A of disc 162A is angled at an angle of −1° (i.e. negatively angled). Top surface 167B of disc 162B is angled at a positive angle of 1° with respect to the downhole tool 10. Top surface 167C of disc 162C is angled at a positive angle of 2° with respect to the vertical axis 163 the downhole tool 10. Top surface 167D of disc 162D is angled at a positive angle of 3° with respect to the vertical axis 163 of downhole tool 10. Likewise, top surface 167E of disc 161E is angled at a positive angle of 4° with respect to the vertical axis 163 of the downhole tool 10, top surface 167F of disc 161F at 5°. In this way, the angle of each top surface 167A-167G of discs 162A-162G increases proportionally along the length of the vertical axis 163 the downhole tool 10. As used herein, the term "positive angle" refers to an angle or slope between any top surface 167 of the discs 162A-162G and the vertical axis 163 of the downhole tool 10 that allows displacement of a respective ball 168 toward upper shaft 38 when the upper shaft 38 is in the vertical position with respect to the Earth's gravity vector. Balls 168A-168G are preferably high mass and non-magnetic. In one embodiment, the balls 168 are preferably comprised of carbide. "Ball" includes any object capable of moving on, or relative, to top surface 167 of a disc 162A-162G from non-engagement with catch pocket 170 to useful engagement with catch pocket 170 responsive to downhole tool 10 inclination changes sought to be measured. This includes, for example, without limitation, rollable objects such as balls, rods, and the like, and slidable objects such as plugs, rods, plates, wedges and the like. Similarly, the term "negatively angled," as used herein, refers to any angle between any top surface 167 of discs 162A-162G and upper shaft 38 that allows displacement of a respective ball 168 away from upper shaft 38 when upper shaft 38 is in the vertical position with respect to the Earth's gravity vector.

Normally, when upper shaft 38 is in the vertical position with respect to the Earth's gravity vector, each of balls 168B-G disposed on each disc 162 rolls toward upper shaft 38 due to the slope of each top surface 167 of disc 162 with the exception of the ball 162A disposed on the disc 161A. Because top surface 167 of disc 162A is negatively angled (i.e. slopes downward away from upper shaft 38 toward the surface 76 of the housing 24), any ball disposed on disc 162A will roll away from upper shaft 38 when downhole tool 10 is in the vertical position with respect to the Earth's gravity vector due to the influence of gravity.

As upper shaft 38 is inclined or deviated from the Earth's gravity vector or vertical axis, the Earth's gravity vector successively influences each respective ball 168 so as to successively displace each successive respective ball 168 away from upper shaft 38 towards housing 24 upon successively sufficient deviation of upper shaft 38. For example, any deviation greater than about 1° from the vertical will cause ball 168B to roll away from upper shaft 38 and to engage housing 24 because top surface 167 of disc 162B is angled at a positive angle of 1° with respect to upper shaft 38. Likewise, any deviation of upper shaft 38 greater than about 2° from the vertical will cause ball 168C to roll away from upper shaft 38 and to engage housing 24, and so on for each ball 168D-168E. In this way, the more deviation that upper shaft 38 experiences, the more balls 168 will move away from upper shaft 38 so as to engage housing 24.

Upper shaft 38 is capable of axial movement in both directions within housing 24. During drilling operations, pressurized drilling mud flowing through the bore 22 of the downhole tool 10 exerts a downward force against the components of the downhole tool 10, thereby compressing spring 90 and displacing balls 168 away from the catch pocket 170. However, once drilling mud is no longer pumped through bore 22, spring 90 exerts upward pressure on upper shaft 38 and causes discs 162 and balls 168 disposed thereon in the upward direction. Catch pocket 170 engages any ball 168 that has rolled away from upper shaft 120 so as to arrest any further upward axial movement of upper shaft 38. Consequently, only one of the balls 168A-168G will be caught in the catch pocket 170. The displaced ball in the highest position closest to the upper shaft 38 will be caught in the catch pocket 38 thereby stopping further upward movement of the upper shaft 38 and communicating a number of pulses that is indicative of the inclination of one of top surfaces 167A-167G of one of discs 162A-162G bearing one of balls 168A-168G that was caught in catch pocket 170. In this way, catch system 173 determines the inclination of upper shaft 38. The inclination of upper shaft 38 is communicated to pressure sensing instrumentation as will be explained in greater detail below.

Figure 4A:
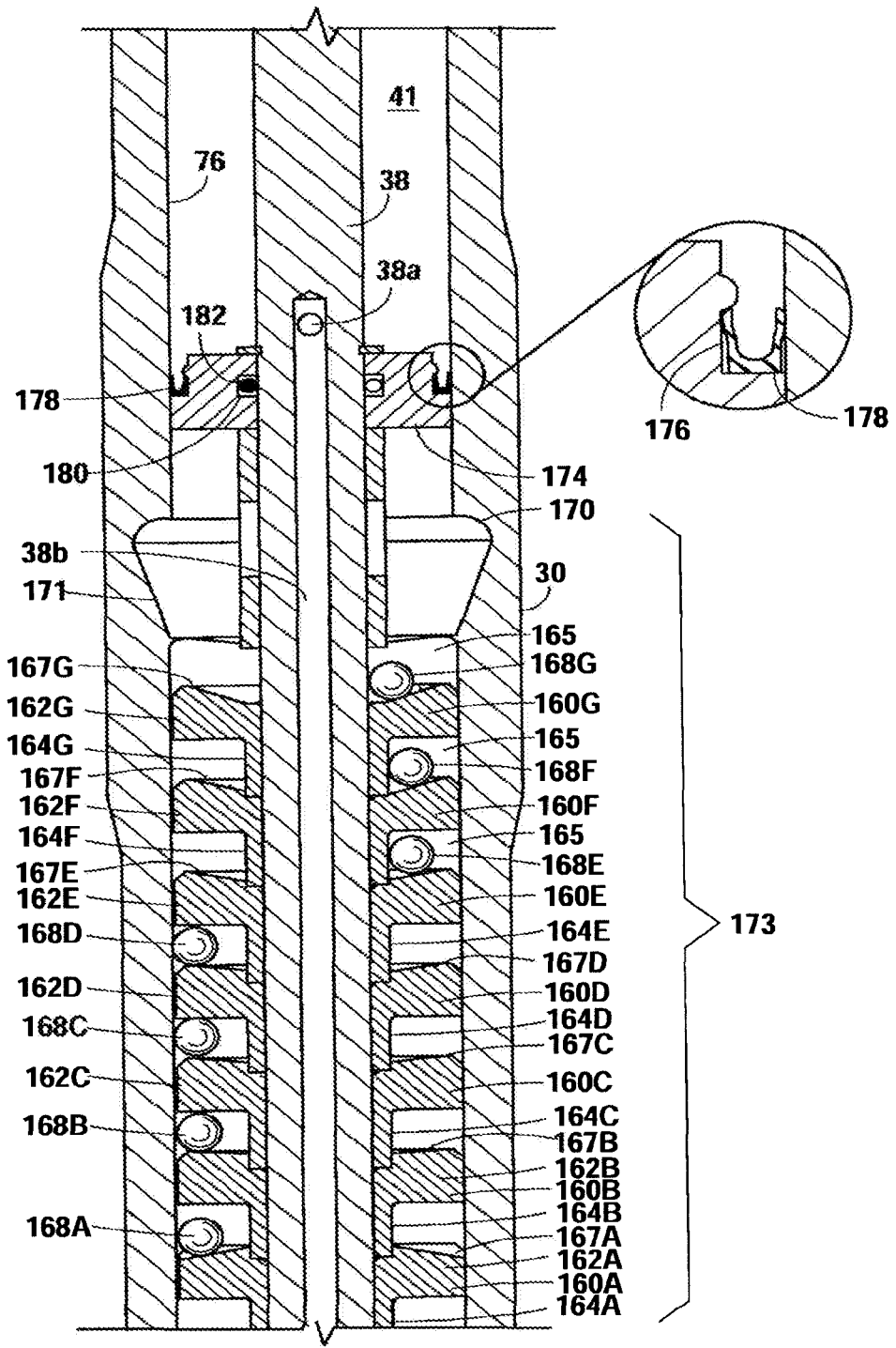
FIG. 4A shows the downhole tool of FIG. 4 in an inclined position while the tool is moving upwardly.

For example, consider a upper shaft 38 that is deviated from vertical by an angle of about 3.5°. As illustrated in FIG. 4A, balls 168E-168G will not engage the catch pocket 170 as disc 162B moves past catch pocket 170 because balls 168E-168G are not displaced away from upper shaft 38 when upper shaft 38 is deviated by about 3.5° due to the respective inclination angles of top surfaces 167 of discs 162E-162G (4°, 5°, and 6° respectively).

Nevertheless, at a deviation of 3.5°, balls 168A-168D will be displaced away from upper shaft 38 and the ball 168D will engage catch pocket 170 as disc 162D moves upward, because the vertical deviation of upper shaft 38 by 3.5° is sufficient to cause displacement of the ball 168D away from the upper shaft 38 so ball 168D engages catch pocket 170. Similarly, balls 168A-168C are also displaced because the inclination of top surfaces 167A-167C are −1°, 1°, and 2°. However, balls 168A-168C do not engage catch pocket 170 because ball 168D would have already engaged catch pocket 170 thereby preventing further upper axial movement of upper shaft 38. As will be explained below, this proportional axial movement of upper shaft 38 indicates that upper shaft 38 is deviated at an angle between 3° and 4°.

In a like manner, other deviations of upper shaft 38 will result in engagements of at least one of balls 168A-168G with catch pocket 170 to arrest upper shaft 38 at other axial displacements of upper shaft 38. As will be explained further below, these proportional axial movements of upper shaft 38 and its consequent arrests may be communicated to the surface via a pressure pulse signaling system.

Pressure Pulse Signaling System

As discussed above, upper shaft 38 is forced upward by spring 90 when the flow of pressurized drilling mud is discontinued. Upward motion of upper shaft 38 causes knob 36 to extend through one or more passage restrictions 34. As knob 36 is moves past each passage restriction 34, a pressure pulse is generated in the flowing drilling mud that may be detected at a surface 190 (FIG. 2) via a pressure transducer (not shown). Measurements of and between such pulses are known to persons of ordinary skill in the art including, without limitation, being graphically represented on a display which may be a strip recorder or any other display known in the art. Another example of displays of such pulses and measurement that may be used is an industrial touch screen or other computer.

Figure 4B:
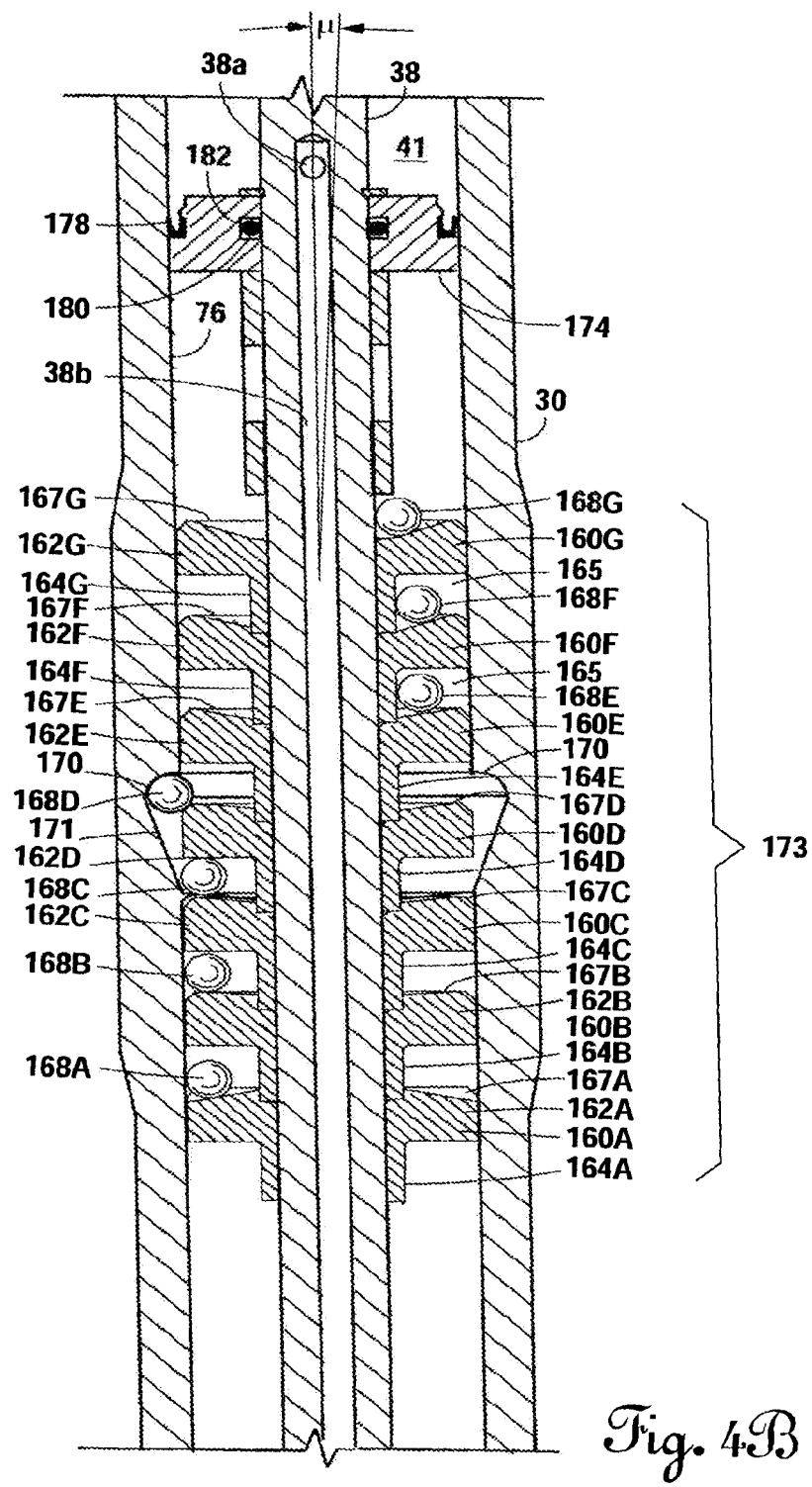
FIG. 4B shows the downhole tool of FIG. 4A in a position where downhole tool communicates an inclination angle.

As shown in FIG. 4B, for an example drill string having an inclination of 3.5°, ball 168D on upper surface 162D with an angle of 3° is the uppermost ball to move into catch pocket 170. This is because, among upper surfaces 167A-167G, upper surface 167D has the angle which is most immediately less than upper shaft 38's 3.5° deviation from the Earth's gravity vector. Likewise, ball 168E on upper surface 162E with angle 4° has not moved into catch pocket 170. Among upper surfaces 167A-167G, upper surface 167E has the angle most immediately greater than upper shaft 38's 3.5° deviation from the Earth's gravity vector. Communicating that ball 168D has moved from adjacent shaft 38 upon upper surface 167D to engage catch pocket 170 and that ball 168E has not moved from adjacent shaft 38 upon upper surface 167E to engage catch pocket 170, communicates that upper shaft 38's deviation from the Earth's gravity vector at tool 10's point of measurement is between the 3° deviation of upper surface 167D and the 4° deviation of upper surface 167E, namely, that the drill string's inclination at tool 10 is between 3° and 4°.

This method is applicable to any inclination angles of the drill string and to any set of chosen upper surface inclination angles. Discs can be chosen with different angles and used within the tool as desired for different circumstances as long as the discs have greater positive angles from the lower end of tool 10 to the upper end of tool 10.

Upper shaft 38's axial movement, or lack thereof, responsive to biasing mechanism 90 urging upper shaft 38 upward and the described movement of some or all of the balls 168A-168D in the catch system comprised of balls 168A-168G, upper surfaces 167A-167G and catch pocket 170 causes knob 36 to change knob 36's position relative to passage restrictions 34. The relative location of the discs 162 relative to catch pocket 170 and of knob 36 relative to passage restrictions 34 is fixed and known. The correspondence between the distances between upper surfaces 167A-167D and the distances between passage restrictions 34 need not be a one-to-one correspondence or a constant correspondence. All that is required is that pulses resulting from any particular upper surface's ball arresting further upward movement of knob 36 on upper shaft 38 through passage restrictions 34 be discernible and communicate knob 36's position relative to passage restrictions 34.

The described structure and method of operation causes tool 10 to be capable of communicating an upper and a lower range of drill string inclinations at tool 10's point of measurement when the flow of drilling fluid is temporarily halted and the upwardly biased shaft 38 and knob 36 cause a measurable pulse in the drilling fluid in cooperation with passage restrictions 34 to communicate which balls 168A-168G have been caught in catch pocket 170 responsive to tool 10's inclination.

Figure 8:
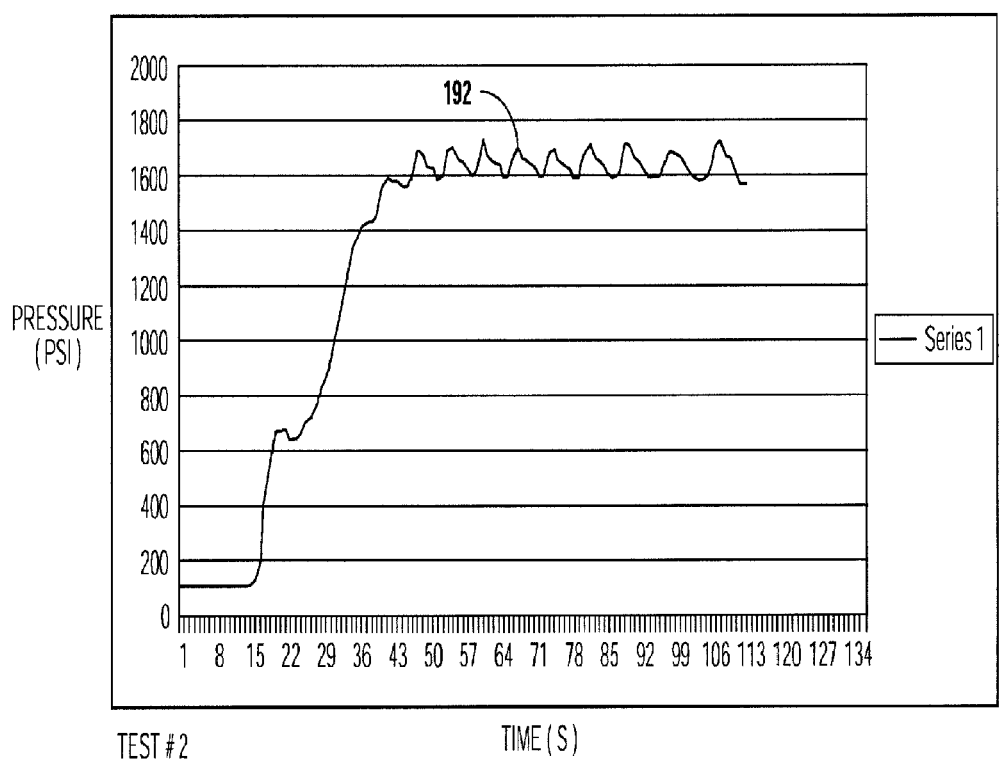
FIG. 8 is a graphical representation of pressure measured over time by the downhole tool of FIG. 1.

FIG. 8 depicts a graphical plot 192 of pressure (PSI) and time (seconds) measured by a pressure transducer in one embodiment of downhole tool 10. It takes approximately 2-5 minutes to obtain a reading from tool 10 when upper shaft 38 is inclined or deviated from the vertical. It is also believed that the tool 10 is capable of returning a neutral reading about 2-5 minutes after the flow of drilling fluid through tool 10 is discontinued. It is believed that the efficiency of tool 10 in reading deviations of a well bore may result in significant time and expense savings when compared to prior art systems.

In order to further improve the efficiency of tool 10, dampening axial movement of upper shaft 38 and knob 36 may be provided. Specifically, positive retention of balls 168 in catch pocket 170 may be more likely where axial movement of upper shaft 38 is limited to a controlled rate of speed. Such dampening may be provided by introducing a dampening fluid, for instance, a silicone fluid into downhole tool 10 via fill ports 120. As will be understood by those of skill in the art, various viscosities of silicone fluid and/or other suitable fluids may be used. For example Silicone Fluid 5 Centistoke, 10 Centisoke, 50 Centistoke and/or any other suitable fluid known to those of skill in the art may be used. During the movement of the catch assembly 173, dampening fluid may be transported from space 124 to space 41 via cross holes 104b, 38b and holes 104a and 38a. A bidirectional flow regulator such as a check valve may be disposed within hole 38a or 104a to regulate the rate of flow of the dampening fluid and improve the reliability of the downhole tool 10.

In certain embodiments, catch pocket 170 may optionally comprise sloped surface 171. As would be recognized by a person of ordinary skill in the art with the benefit of this disclosure, sloped surface 171 allows release of balls 168A-168G from catch pocket 170 when upper shaft 38 and discs 162A-162G move to a lower or second position. Without the corresponding disc 162 holding a ball 158 in catch pocket 170, gravity pulls balls 168A-168G from catch pocket 170. In this way, catch pocket 170 arrests balls 168A-168G travelling in a first direction (e.g. towards an upper position) but releases balls 168A-168G to travel in a second direction (e.g. towards a lower position). Once released into bore 22, balls 168A-168G are movably carried within bore 22 by discs 168A-168G. In yet another embodiment, catch pocket 170 may be formed as integral to housing 24 or may be formed of an additional element that is operably affixed to housing 24.

Furthermore, it is explicitly recognized that any number of discs 162 may be used in combination with catch system 173 as desired. Moreover, the angling of discs 162A-162G may be adjusted to offer finer or cruder increments of measurement. For example, disc 162A-162G could be angled in 0.5°, 0.25°, or other increasing increments so as to provide a more accurate measurement than the aforementioned example where 1° angle increments were utilized. The angles defined by top surfaces 167A-167G may be any chosen angle as long as the angle increases incrementally in the first direction. One of ordinary skill in the art would recognize that the number of discs 162A-162G can be changed depending on expected operating conditions.

In an alternative embodiment, the vertical distance between the top surfaces 167A-167G are not constant distances and the veridical distances between the corresponding passage restrictions 34 corresponds to such variable distances between top surfaces 167A-167G. The correspondence between the top surfaces 167A-167G and the distances between passage restrictions need not be either a one to one correspondence or a constant correspondence. All that is required is that pulses resulting from any of balls 168A-168G arresting further upward movement of the upper shaft be discernible and known.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

The present invention is applicable to measuring inclination relative to the direction of gravity where conventional methods are inappropriate. The present invention is also applicable to measuring inclination relative to forces other than the earth's gravity.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A downhole tool for measuring and communicating inclination of the downhole tool comprising:
    a housing having an inner surface and a flow conduit therein, the flow conduit having a plurality of passage restrictions;
    a knob movable axially within the flow conduit, the knob adapted to interact with the passage restrictions to cause a flow restriction when the knob is adjacent a passage restriction;
    wherein the knob is operably connected to an upper shaft;
    a plurality of discs axially movable by the upper shaft, wherein at least some of the discs have a surface angled with respect to the axis of the upper shaft and wherein at least one of the discs has a disc/shaft angle which different than the disc/shaft angle of another of the discs;
    wherein a first disc corresponds to a first passage restriction and a second disc corresponds to a second passage restriction, such that passage of the knob past the first passage restriction corresponds to passage of the first disc by the catch pocket, and location of the knob adjacent the second passage restriction corresponds to location of the second desk adjacent the catch pocket;
    balls disposed on at least some of the discs;
    a catch pocket located within the housing;
    wherein sufficient inclination of the downhole tool causes at least one of the balls to move on the ball's disc from non-engagement with the catch pocket to engagement with the catch pocket to arrest the upper shaft from movement in an axial direction and to position the knob adjacent the engaged ball's disc's corresponding passage restriction, causing a flow restriction at the corresponding passage restriction; and
    wherein the downhole tool is capable of communicating its angle of inclination via a pressure pulse.

2. The downhole tool of claim 1, wherein the flow conduit comprises at least four consecutive passage restrictions therein, the plurality of discs comprises at least four discs, and the downhole tool further comprises a biasing mechanism located and adapted to bias the knob in a first direction.

3. The downhole tool of claim 2, wherein the angles between the upper surfaces successive discs differ by at least 0.5°, and wherein at least one upper surface defines an angle with respect to the upper shaft that is a negative angle such that no inclination of the upper shaft is required to cause a ball corresponding to the at least one disc to engage the catch pocket when axial movement of the upper shaft causes the ball to pass adjacent to the catch pocket.

4. The downhole tool of claim 2, wherein the knob is movable axially within the flow conduit upon the influence of the flow of fluid in a second direction, wherein the second direction is opposite the first direction, and the knob includes a surface area which is large enough that the flow of fluid in the second direction is capable of displacing the knob in the second direction, the knob being adapted to interact with the passage restrictions to cause a flow restriction within the flow conduit when the knob is adjacent a passage restriction relative to when the knob is not adjacent a passage restriction; and
    wherein the downhole tool is capable of communicating its angle of inclination via pressure pulses signaling the highest angle disc which has its ball engaged with the catch pocket.

5. A downhole tool for determining inclination of a portion of a drill string comprising:
    a housing having a flow conduit therein for the flow of fluid;
    an upper shaft located within the housing and axially movable within the housing in a first direction and a second direction;
    a plurality of discs axially movable by the upper shaft, wherein a first disc has a surface angled relative to the upper shaft, wherein the first disc's surface and the upper shaft define a first disc/shaft angle;
    wherein a second disc has a surface angled relative to the upper shaft, wherein the second disc's surface and the upper shaft define a second disc/shaft angle;
    wherein the first disc/shaft angle is different from the second disc/shaft angle;
    one or more balls disposed on the surface of the first disc;
    one or more balls disposed on the surface of the second disc; and
    a catch pocket disposed on the housing;
    wherein upon sufficient inclination of the upper shaft and sufficient movement of the upper shaft in the first direction, at least one of the balls is capable of moving away from the upper shaft to engage the catch pocket to arrest the upper shaft from further axial movement in the first direction; and
    wherein the downhole tool is capable of communicating its angle of inclination via a pressure pulse.

6. The downhole tool of claim 5, further comprising:
    a knob operably connected to the upper shaft;
    the upper shaft is biased in the first direction;
    the knob is movable due to the flow of drilling fluid in the second direction,
    wherein the second direction is opposite the first direction;
    the flow conduit having at least four passage restrictions therein;
    wherein the knob is movable within the flow conduit and adapted to interact with the passage restrictions to cause a greater flow restriction when the knob is adjacent one of the passage restrictions relative to when the knob is not adjacent one of the passage restrictions; and
    wherein the position of the knob within the flow conduit is capable of communicating by inclination of the downhole tool pressure pulse signaling.

7. The downhole tool of claim 6, wherein, the plurality of discs comprises at least four discs, and the downhole tool further comprises a biasing mechanism located and adapted to bias the knob in a first direction.

8. The downhole tool of claim 7, wherein the angles between the upper surfaces successive discs differ by at least 0.5°, and wherein at least one upper surface defines an angle with respect to the upper shaft that is a negative angle such that no inclination of the upper shaft is required to cause a ball corresponding to the at least one disc to engage the catch pocket when axial movement of the upper shaft causes the ball to pass adjacent to the catch pocket.

9. The downhole tool of claim 7, wherein the knob is movable axially within the flow conduit upon the influence of the flow of fluid in a second direction, wherein the second direction is opposite the first direction, and the knob includes a surface area which is large enough that the flow of fluid in the second direction is capable of displacing the knob in the second direction, the knob being adapted to interact with the passage restrictions to cause a flow restriction within the flow conduit when the knob is adjacent a passage restriction relative to when the knob is not adjacent a passage restriction; and
    wherein the downhole tool is capable of communicating its angle of inclination via pressure pulses signaling the highest angle disc which has its ball engaged with the catch pocket.

10. A method for determining the inclination of a downhole tool relative to a gravity vector comprising:
    using a downhole tool comprising:
    a housing having a flow conduit therein for a flow of fluid there through, the flow conduit having a plurality of passage restrictions therein;
    a knob operably connected to the upper shaft and movable axially within the flow conduit, wherein the knob is capable of causing a flow restriction when the knob is adjacent one or more of the passage restrictions;
    wherein the knob is movable due to the flow of fluid in a second direction wherein the second direction is opposite the first direction;
    a plurality of discs operably connected to the upper shaft, wherein a surface of each disc is angled with respect to the upper shaft, wherein each top surface defines an angle with respect to the upper shaft, wherein each angle is different from the other angles;
    one or more balls disposed on each of the discs;
    a catch pocket located in the housing;
    wherein sufficient inclination of the downhole tool causes at least one of the balls to move from a non-engaged position where the upper shaft may move axially, to an engaged position where the ball engages the catch pocket to arrest the upper shaft from axial movement in the first direction;
    wherein the knob is adapted to pass passage restrictions corresponding to discs which pass the catch pocket and to stop adjacent a passage restriction corresponding to the disc which does not pass by the catch pocket, causing a flow restriction;
    moving the upper shaft relative to the catch pocket so one or more balls engage the catch pocket to arrest axial movement of the upper shaft in the first direction to create pressure pulses in the fluid corresponding to passage restrictions through which the knob passes, the pressure pulses communicating the downhole tool's inclination relative to a gravity vector;
    and determining the downhole tool's inclination relative to a gravity vector from the pressure pulses.

11. The method of claim 10, wherein the flow conduit comprises at least four consecutive passage restrictions therein, the plurality of discs comprises at least four discs, and the downhole tool further comprises a biasing mechanism located and adapted to bias the knob in a first direction.

12. The method of claim 11, wherein the angles between the upper surfaces successive discs differ by at least 0.5°, and wherein at least one upper surface defines an angle with respect to the upper shaft that is a negative angle such that no inclination of the upper shaft is required to cause a ball corresponding to the at least one disc to engage the catch pocket when axial movement of the upper shaft causes the ball to pass adjacent to the catch pocket.

13. The method of claim 11, wherein the knob is movable axially within the flow conduit upon the influence of the flow of fluid in a second direction, wherein the second direction is opposite the first direction, and the knob includes a surface area which is large enough that the flow of fluid in the second direction is capable of displacing the knob in the second direction, the knob being adapted to interact with the passage restrictions to cause a flow restriction within the flow conduit when the knob is adjacent a passage restriction relative to when the knob is not adjacent a passage restriction; and wherein the downhole tool is capable of communicating its angle of inclination via pressure pulses signaling the highest angle disc which has its ball engaged with the catch pocket.

* * * * *